United States Patent
Kuboyama

(10) Patent No.: US 8,083,057 B2
(45) Date of Patent: Dec. 27, 2011

(54) SCREW FEEDER HAVING A MAGAZINE FOR HOLDING A SCREW HEAD

(75) Inventor: Makoto Kuboyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 232 days.

(21) Appl. No.: 12/470,791

(22) Filed: May 22, 2009

(65) Prior Publication Data

US 2010/0018354 A1 Jan. 28, 2010

(30) Foreign Application Priority Data

Jul. 25, 2008 (JP) .................................. 2008-192447

(51) Int. Cl.
*B65D 85/24* (2006.01)

(52) U.S. Cl. ...................................... 206/338; 206/564
(58) Field of Classification Search ................... 206/338, 206/339, 718, 722, 723, 557, 564; 227/120, 227/123, 127; 221/69, 197, 227; 81/57.37, 81/430, 434

See application file for complete search history.

(56) References Cited

U.S. PATENT DOCUMENTS

| | | | | |
|---|---|---|---|---|
| 4,889,229 A | * | 12/1989 | Yamamoto et al. | 206/723 |
| 5,735,408 A | * | 4/1998 | Fukuda et al. | 206/723 |
| 5,950,864 A | * | 9/1999 | Cash et al. | 221/227 |
| 6,340,088 B1 | * | 1/2002 | Mouri et al. | 206/722 |
| 7,658,283 B2 | * | 2/2010 | Pally et al. | 206/338 |
| 2001/0013483 A1 | * | 8/2001 | Konno et al. | 206/722 |

FOREIGN PATENT DOCUMENTS

| | | |
|---|---|---|
| JP | 4-5306 A | 1/1992 |
| JP | 8-192371 A | 7/1996 |
| JP | 3041627 U | 9/1997 |
| JP | 2005-34943 A | 12/2005 |

* cited by examiner

*Primary Examiner* — Luan K Bui
(74) *Attorney, Agent, or Firm* — Westerman, Hattori, Daniels & Adrian, LLP

(57) ABSTRACT

A screw feeder includes a magazine configured to store a plurality of screws arranged along a single line, and a magazine table configured to support the magazine. A pair of rail members slidably support head portions of the screws. A spacer is sandwiched and fixed between the rail members. Threaded portions of the screws are accommodated in a slot formed by the spacer being sandwiched between the rail members. The rail members and the spacer are detachably attached to each other.

8 Claims, 14 Drawing Sheets

SCREW FEEDER HAVING A MAGAZINE FOR HOLDING A SCREW HEAD

CROSS-REFERENCE TO RELATED APPLICATIONS

This application is based upon and claims the benefit of priority of the prior Japanese Patent Application No. 2008-192447, filed on Jul. 25, 2008, the entire contents of which are incorporated herein by reference.

FIELD

The embodiment discussed herein is directed to a screw feeder having a magazine for storing screws.

BACKGROUND

In an assembly line of a machine assembly factory, there are many cases in which parts are attached and assembled by fastening screws, and an assembly process includes many screw fastening processes. In many screw fastening processes, an automatic screw feeder is used in order to reduce a process time of fastening screws.

Generally, an automatic screw feeder has a hopper for storing many screws and a conveyance part for taking screws out of the hopper and conveying the screws to a screw pick-up part (a position where the screws are picked up by a screw driver) while aligning the screws. Screws stored in the hopper move automatically to an inlet of the conveyance part due to a vibration of the hopper, and the screws enter the conveyance part one after another with the same orientation. The screws entering the conveyance part move along a screw passage of the conveyance part due to gravity or vibration, and are carried to the screw pick-up part. The screws moved to the screw pick-up part are attracted by a bit of a screw driver and taken out of the screw pick-up part. In the above-mentioned automatic screw feeder, there is a problem often occurs in that a screw feeding operation stops due to screw jamming at the hopper or the inlet of the conveyance part. The screw jamming is caused by a variation in the shape of screws or a variation in the orientation of the screws.

Although there is suggested a mechanism to scoop screws in a hopper using a swing arm and supply the screws to a conveyance part, it is difficult to align the screws scooped by the swing arm because the orientations of the screws scooped by the swing arm are all different and the screws tend to cling with each other. Thus, there also is a problem that a screw feeding operation stops due to screw jamming.

Thus, a method is used in which screws are accommodated in holes arranged in a plate-like tray and the screws are picked up by a screw driver one by one. Specifically, many screws are put in the holes of the plate-like tray in a matrix arrangement and the tray is located at a pick-up position of the screws by a screw driver. This method is used in many cases as a screw supply method for supplying screws, such as, for example, a screw provided with an O-ring, that are difficult to handle by a hopper and a conveyance part.

However, in order to pick up the screws from the plate-like tray one by one, an operator must locate a driver bit to a different position each time because a position at which each screw is picked up differs from screw to screw, which is inconvenient for the operator. Additionally, there is no good method which can locate screws to the holes of the plate-like tray. Thus, the screws are located to the holes of the plate-like tray manually, which causes an increase in a manufacturing cost.

Thus, there is suggested use of a cassette for accommodating screws instead of a plate-like tray, which cassette accommodating screws along a line in the same orientation with screw heads facing above (for example, refer to Patent Documents 1 and 2).

Patent Document 1: Japanese Laid-Open Patent Application No. 8-192371

Patent Document 2: Japanese Utility Model Registration No. 3041627

The cassette, which accommodates screws by being arranged along a line, has a slot that can hold screw heads. Accordingly, the screws are accommodated in the slot of the cassette in a state where the screws are arranged along an extending line of the slot and the screw heads of the screws are supported by elongated members forming the slot.

In a conventional single line accommodation cassette, in order to accommodate threaded parts of screws in a slot while supporting the screw heads, the width of the slot is slightly smaller than the diameter of the screw heads and slightly larger than the diameter of the threaded parts. Accordingly, when feeding screws having a different diameter, the cassette must be replaced with another cassette suitable for the screws having the different diameter, which is inconvenient for the operator.

Moreover, there still is no good method of loading screws to the cassette. A screw loading machine for aligning and feeding screws using a vibration or a swing arm has a complex structure and expensive.

Thus, it is desired to develop a simple structure screw feeder having a single line accommodating cassette or magazine that can be used with different diameter screws. Additionally, it is desired to develop a screw loading apparatus having a simple structure, which can load screws to a single line accommodating cassette or magazine.

In a conventional screw feeder, screws are attracted by a magnetized bit of an electric screw driver to perform a screw fastening operation (disclosed in, for example, Japanese Laid-Open Patent Application No. 4-5306). If the screws are made of a non-magnetic material, the magnetized bit is not effective and a suction type electric screw driver is used to attract each screw to a driver bit by suctioning. However, it is difficult to pick up the screws from the screw feeder by suctioning each screw at a screw pick-up position.

SUMMARY

According to an aspect of the invention, a screw feeder comprises: a magazine configured to store a plurality of screws arranged along a single line; and a magazine table configured to support the magazine, wherein said magazine includes: a pair of rail members slidably supporting head portions of the screws; and a spacer sandwiched and fixed between the rail members, wherein threaded portions of the screws are accommodated in a slot formed by the spacer being sandwiched between the rail members, and the rail members and the spacer are detachably attached to each other.

According to another aspect, a screw feeder has a screw pick-up part, wherein the screw pick-up part includes: a conical part having a conical inner surface; a cylindrical part provided at a bottom of the conical part, the cylindrical part having a center axis coincident with a center axis of the conical part; and a stopper provided in a bottom part of the cylindrical part so as to be brought into contact with a head portion of a screw so that a center axis of the screw is coincident with the center axis of the conical inner surface of the conical part.

According to another aspect, a screw loading apparatus is detachably attached to a magazine of a screw feeder so as to load a plurality of screws to said magazine, the screw loading apparatus comprising: a tray configured to movably accommodate the screws; a guide slot provided on one side of the tray so as to accommodate head portions of the screws in a state where center axes of the screws are parallel to a surface of the tray; a connection part for connecting with the magazine; and a lid attachable to the tray so as to cover threaded portions of the screws of which head portions are accommodated in the guide slot in the tray.

The object and advantages of the embodiment will be realized and attained by means of the elements and combinations particularly pointed out in the appended claims.

It is to be understood that both the foregoing general description and the following detailed description are exemplary explanatory only and are not restrictive of the invention, as claimed.

DESCRIPTION OF EMBODIMENT(S)

Preferred embodiment of the present invention will be explained with reference to the accompanying drawings.

Figure 1:
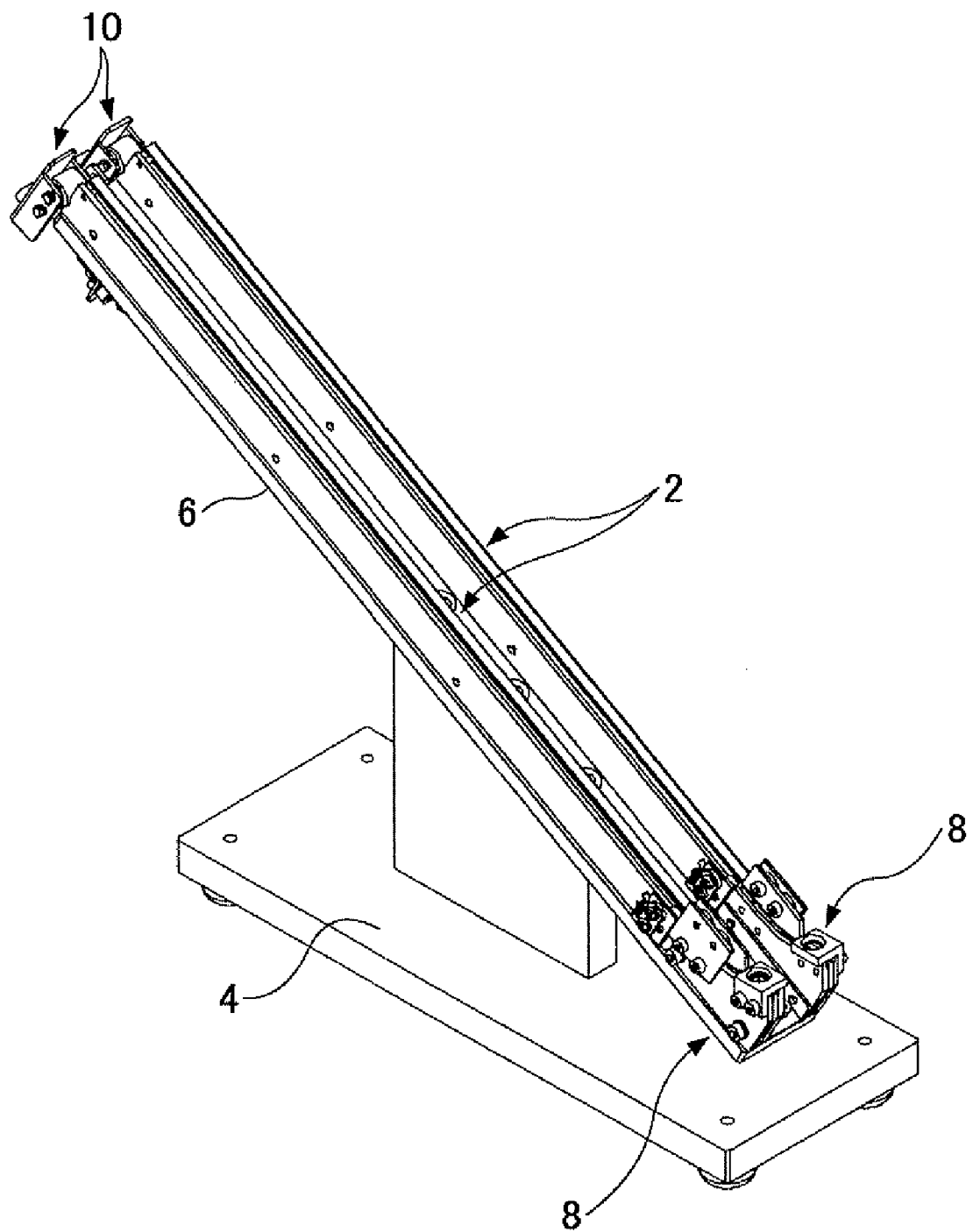
FIG. 1 is a perspective view of a screw feeder according to an embodiment.

FIG. 1 is a perspective view of a screw feeder according to an embodiment. The screw feeder illustrated in FIG. 1 has two magazines 2, each of which accommodates a plurality of screws, and a magazine stand 4, which supports the magazines 2 in an inclined state. The magazine stand 4 has a table 6 on which the magazines 2 are attached. Screw pick-up parts 8 to which ends of the magazines 2 are connected, respectively, are fixed to the table 6. Magazine fixing parts 10 are provided on the other ends of the magazines 2 opposite to the screw pick-up parts 8. The magazine fixing parts 10 engage with the ends of the magazines 2, respectively, so as to fix the magazines 2 to the table 6.

Each of the two magazines 2 can be detached from the table 6 and the screw pick-up parts 8 by disengaging the magazine fixing parts 10 from the magazines 2.

Figure 2:
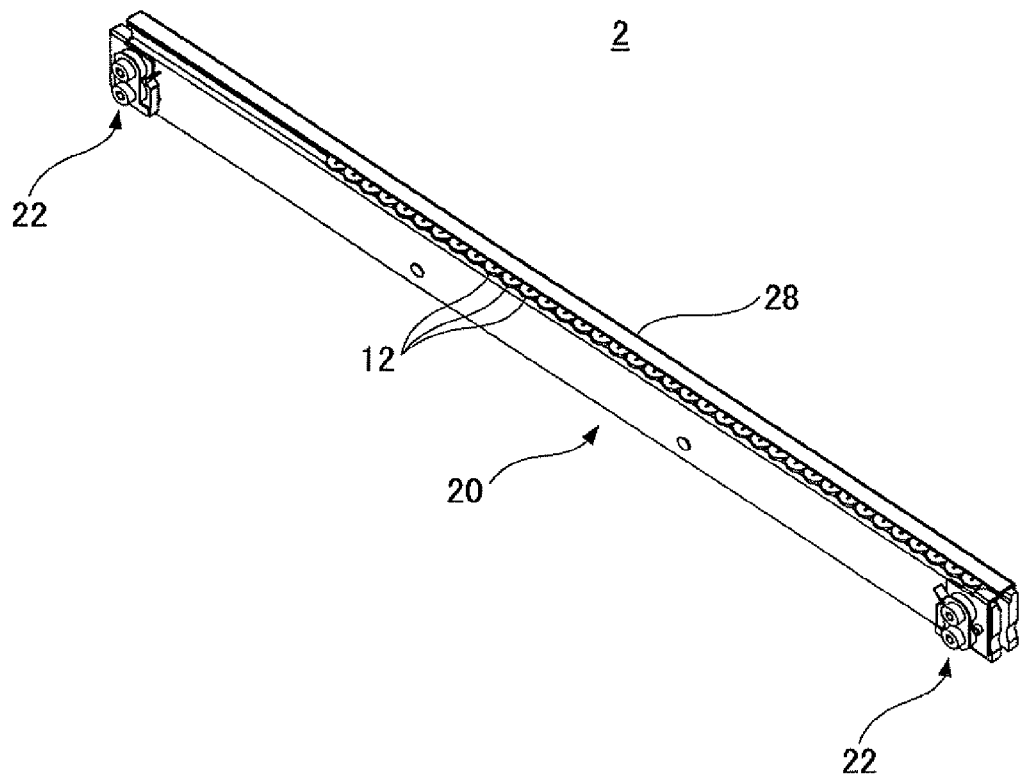
FIG. 2 is a perspective view of a magazine.

FIG. 2 is a perspective view of the magazine 2. The magazine 2 has a magazine body 20, which accommodates many screws in a state where the screws are aligned along a single line, and shutter mechanisms 22 are provided on opposite ends of the magazine body 20 in a longitudinal direction thereof. The shutter mechanisms 22 are provided to close a passage of the screws 12 to prevent the screws 12 from going out of the magazine body 20 as mentioned later.

Figure 3:
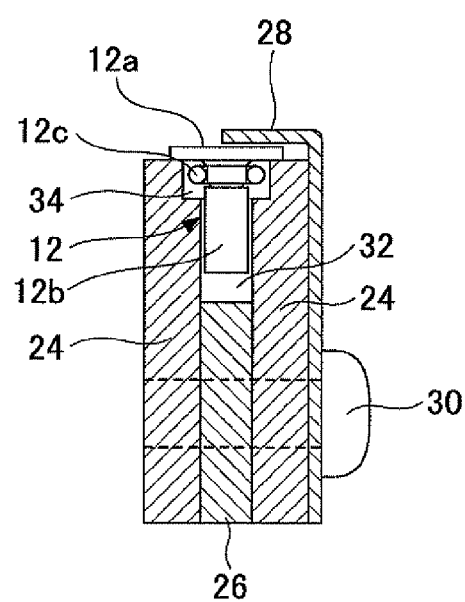
FIG. 3 is a cross-sectional view of the magazine.

FIG. 3 is a cross-sectional view of the magazine 2. The magazine body 20 has a pair of rails (rail members) 24 and a spacer 26 sandwiched and fixed between the rails 24. Further, a cover 28 is provided to the magazine body 20 so as to partially cover the head portions 12a of the screws 12.

The pair of rails 24, the spacer 26 and the cover 28 are fixed to each other by being fastened by fastening screws 30 in a state where the spacer 26 is sandwiched between the rails 24 and the cover 28 is arranged along a side surface of one of the rails 24. The fastening screws 30 are provided at a plurality of positions along the longitudinal direction of the rails 24 so as to firmly fix the rails 24 and the space 26 to form the magazine body 20.

Screw holes into which the fastening screws 30 are screwed are provided on one of the rails 24, and penetrating holes are provided to the spacer 26, the other of the rails 24 and the cover 28. Accordingly, the spacer 26 and the rails 24 can be fixed to each other by inserting the fastening screws 30 into the respective penetrating holes of the cover 28, the rail 24 on one side and the spacer 26 between the rails 24, and screwing the fastening screws 30 into the respective screw holes of the rail 24 on the other side. Accordingly, the rails 24 and the spacer 26 can be separated easily by unscrewing the fastening screws 30. Since the cover 28 is also fixed by the fastening screws 30, the cover 28 can also be separated from the rails 24.

As mentioned above, a slot 32 (first slot) having a width equal to the thickness of the spacer 26 is formed between the rails 24 by fixing the pair of rails 24 by sandwiching the spacer 26 therebetween. The slot 32 forms a space for accommodating threaded portions 12b of the screws 12.

If each of the screws 12 is a screw provided with an O-ring as illustrate in FIG. 3, the O-ring 12c is provided under the head portion 12a of the screw 12. Thus, a slot 34 (second slot) having a width larger than the width of the slot 32 (first slot) is formed as a clearance groove for the O-ring 12c. That is, the O-ring 12c does not contact the inner surfaces or the top surfaces of the rails 24 (surfaces on which the head portion 12a of the screw 12 slides) by forming the slot 34 having a large width in a portion corresponding to the O-ring 12c. Thereby, the screw 12 is movable along the slot 32 smoothly.

The cover 28 rises from a side surface of one of the rails 24 and bends by 90 degrees so as to partially cover the head portions 12a of the screws 12 accommodated in the slot 32. By partially covering the head portions 12a of the screws 12, the screws 12 are prevented from coming out of the slot 32 and falling from the magazine 2 when the magazine 2 is inclined or a shock is applied to the magazine 2. Additionally, by covering not an entire head portion 12a of each screw 12 but a part of the head portion 12a of each screw 12, a state of each screw 12 accommodated in the magazine 2 can be easily recognized by visual checking. Further, an orientation of each screw 12 accommodated in the magazine 2 can be corrected by contacting each screw 12. In the example illustrated in FIG. 3, almost a half of the head portion 12a of each screw 12 is covered by the cover 28 when viewed from above.

The attachment position of the cover 28 can be shifted up and down. Accordingly, a distance between the cover 28 and the top surfaces of the rails 24 can be adjusted to a distance with which the cover 28 does not contact the head portion 12a of each screw 12.

According to the magazine 2 having the above-mentioned structure, the magazine 2 can be changed into a magazine, which can accommodate screws having a different diameter, by replacing the spacer 26 with a different spacer having a different thickness. Accordingly, there is no need to prepare many magazines each of which accommodates screws having a different diameter, thereby reducing a cost of the screw feeder.

Figure 4B:
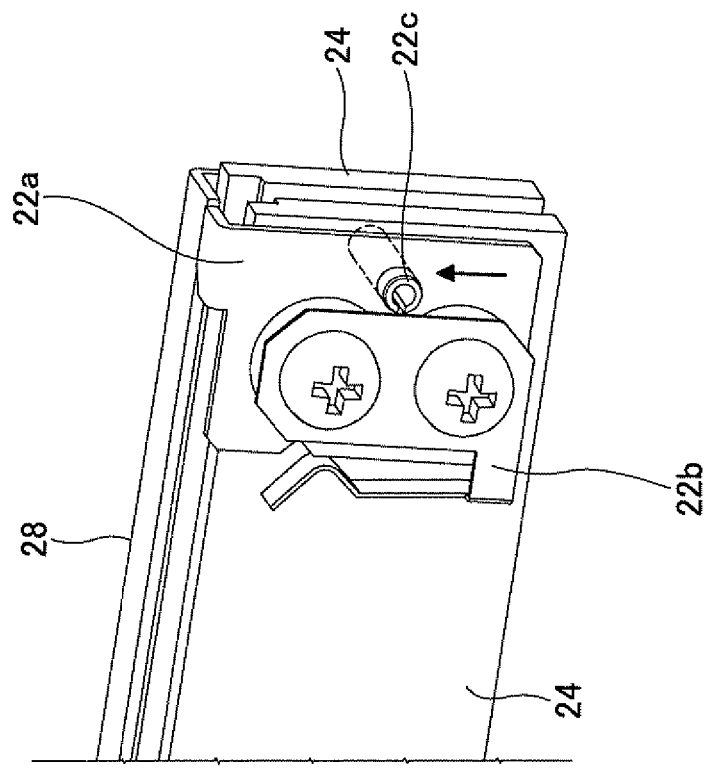
FIG. 4B is an enlarged perspective view of the shutter mechanism in which the shutter is at an opening position.
Figure 4A:
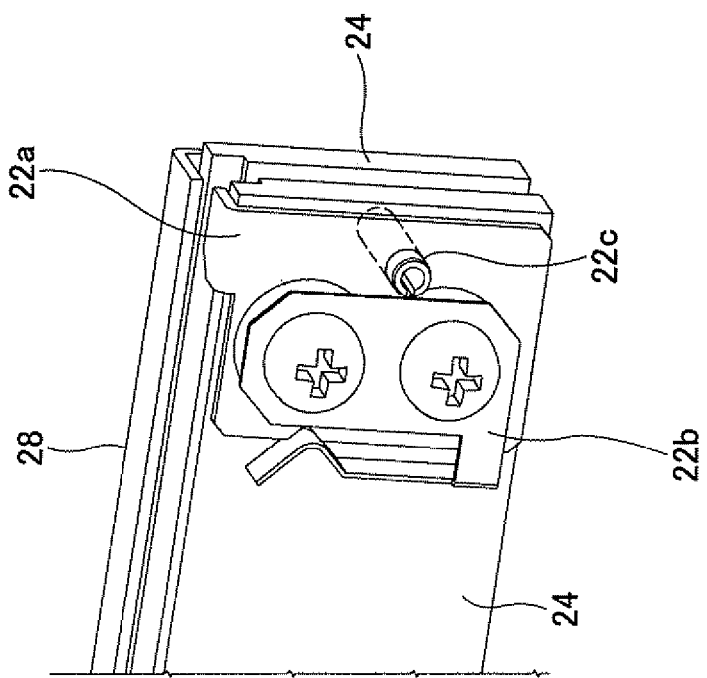
FIG. 4A is an enlarged perspective view of a shutter mechanism in which a shutter is at a closing position.

A description will be given below of the shutter mechanism 22 provided on opposite ends of the magazine body 20. FIG. 4A is an enlarged perspective view of the shutter mechanism 22 in a state where a shutter is closed. FIG. 4B is an enlarged perspective view of the shutter mechanism 22 in a state where the shutter is open.

The shutter mechanism 22 includes a shutter 22a, a shutter close locking spring 22b and a shutter pin 22c. The shutter 22a has a contact part, which extends from an opposite side of the cover 28 to a top surface of the rail 24. The contact part serves as a shutter to stop the screws 12. The shutter 22a is movably attached to the rail 24 between a first position and a second position. At the first position, the contact part is in contact with or close to the top surface of the rail 24 (the position illustrated in FIG. 4A). At the second position, the contact part is at the same position as the cover 28 (the position illustrated in FIG. 4B). Accordingly, when the shutter 22a is at the first position, the screws 12 supported by the top surfaces of the rails 24 in the magazine 2 are stopped by the shutter 22a so that the screws do not move out of the magazine 2. If the shutter 22a is moved to the second position, the head portions 12a of the screws 12 do not contact the contact part of the shutter 22a, and the screws 12 can move out of the magazine 2 by passing under the contact part.

The shutter close locking spring 22b is pressed onto the shutter 22a. In a state where the shutter 22a is at the first position and the shutter 22a is closed, the shutter close locking spring 22b engages with a notch provided on a side part of the shutter 22a. Thereby, the shutter 22a is retained at the first position. The shutter 22a is always urged by a part of the shutter close locking spring 22b (not illustrated in the figure) so that the shutter 22a is at the first position.

When a force is applied to the shutter 22a so as to move the shutter 22a to the second position, the shutter 22a tends to move. However, if the force is weak, the engagement of the shutter 22a cannot move from the first position because the shutter close locking spring 22b cannot be disengaged from the notch of the shutter 22a. If the force applied to the shutter 22a is sufficiently large, a portion of the shutter close locking spring 22b engaged with the notch of the shutter 22a is pressed up and the shutter close locking spring 22b is disengaged from the shutter 22a. Thus, the shutter 22a can move to the second position against the urging force of the shutter close locking sprint 22b.

Thus, in order to move the shutter 22a, the shutter pin 22c is attached to the shutter 22a. The shutter pin 22c penetrates an elongated hole (not illustrated in the figure), which penetrates the rail 24, and protrudes into a space (slot) between the rail 24 and the other rail 24 on the opposite side. Therefore, by pressing the shutter pin 22c protruding between the rails 24, the shutter 22a can be moved from the first position (FIG. 4A) to the second position (FIG. 4B). When the pressing force to the shutter pin 22c is cancelled, the shutter 22a automatically returns to the first position due to the urging force of the shutter close locking spring 22b. In a normal state, the shutter 22a is at the first position, and one of the screws 12 at the end of the line in the magazine 2 is brought into contact with the shutter 22c and cannot move out of the magazine 2. An operation to open the shutter by pressing the shutter pin 22c will be described later.

Figure 5:
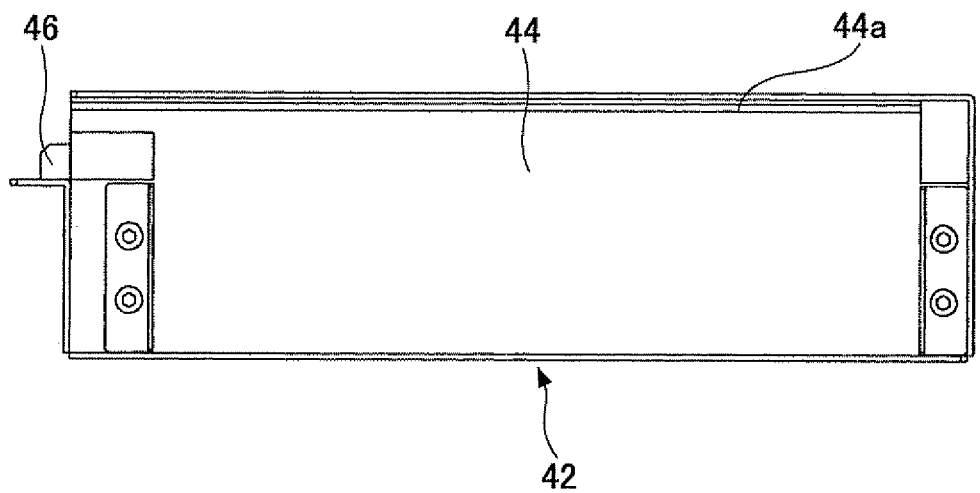
FIG. 5 is a plan view of a screw loading apparatus.
Figure 6:
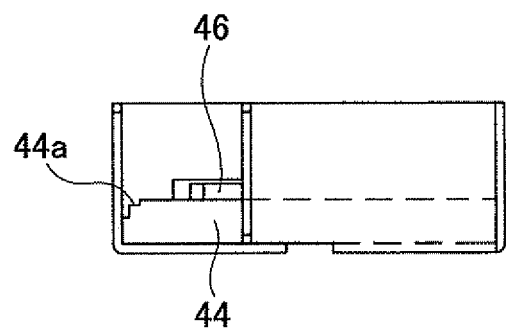
FIG. 6 is a side view of the screw loading apparatus.

A description will be given below of a screw loading apparatus 40 for loading the screws 12 to the magazine 2. FIG. 5 is a plan view of the screw loading apparatus 40. FIG. 6 is a side view of the screw loading apparatus 40.

The screw loading apparatus 40 has a tray 42 having a box shape of which top is open. A tray bottom plate 44 is attached inside the tray 42. A screw head guide slot 44a is formed on one side of the tray bottom plate 44. An end of the screw head guide slot 44a of the tray 42 is open, and a magazine guide 46 is attached to the tray 42 in a state where the magazine guide 46 protrudes from an outer wall of the tray 42.

Figure 9:
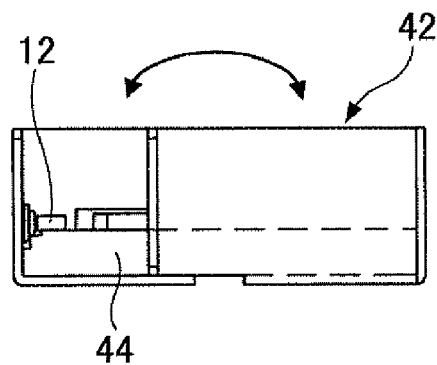
FIG. 9 is a side view of the screw loading apparatus viewed from a side provided with an opening.
Figure 10:
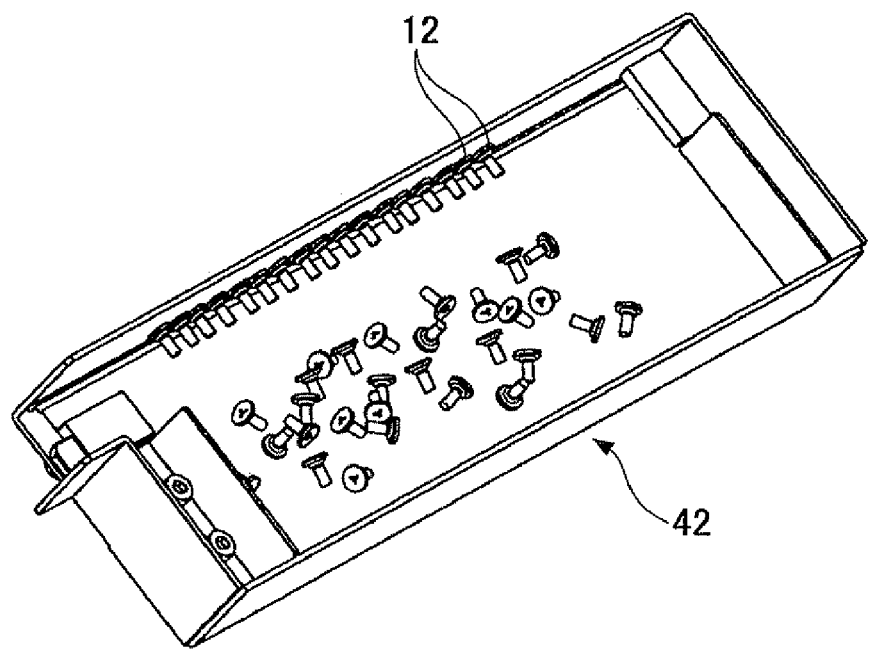
FIG. 10 is a perspective view of the screw loading apparatus in which many screws are put on the tray.

When many screws 12 are placed on the tray bottom plate 44 of the tray 42 and the tray 42 is shaken in directions indicated by arrows in FIG. 9, the screws 12 move on the tray bottom plate 44 while changing their orientations. Then, a part of the head portion 12a of each of the screws 12, which have moved to the position of the screw head guide slot 44a, enters the screw head guide slot 44a. Thus, the screws 12 of which head portions 12a enter the screw head guide slot 44a cannot move by shaking the tray 42, and the screws 12 are aligned in an extending direction of the screw head guide slot 44a.

FIG. 9 is a side view of the tray 42 viewed from the side provided with the opening. The screw 12 of which a part of the head portion 12a enters the screw head guide slot 44a is illustrated in FIG. 9. By moving the screws 12 along the screw head guide slot 44a, the aligned screws 12 can be moved out of the tray 42 one after another though the opened portion of the tray 42.

Figure 7:
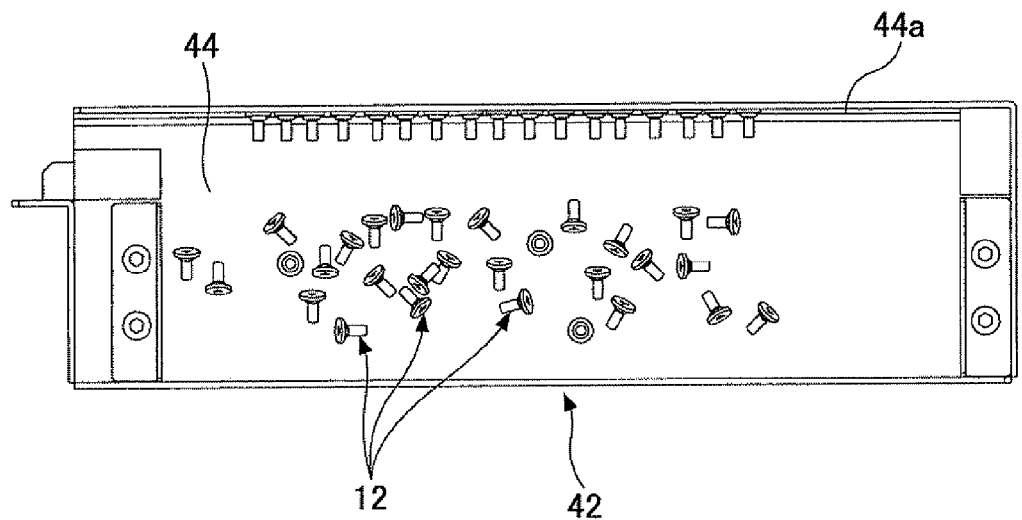
FIG. 7 is a plan view of the screw loading apparatus in which many screws are put on a tray.
Figure 8:
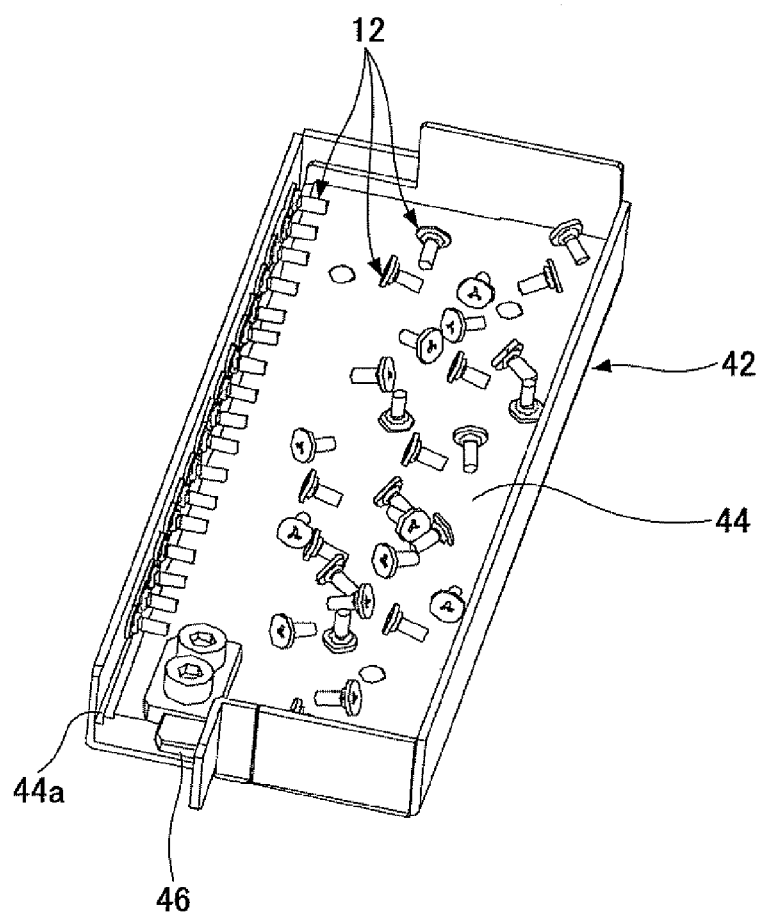
FIG. 8 is a perspective view of the screw loading apparatus in which many screws are put on the tray.
Figure 11:
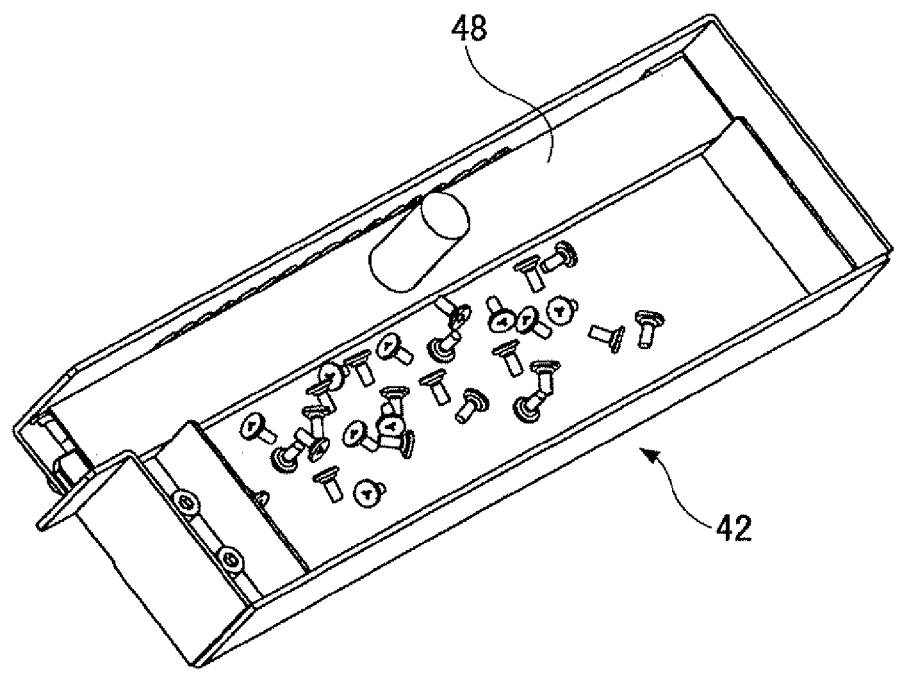
FIG. 11 is a perspective view of the screw loading apparatus in which a guide lid is attached to the tray.
Figure 12:
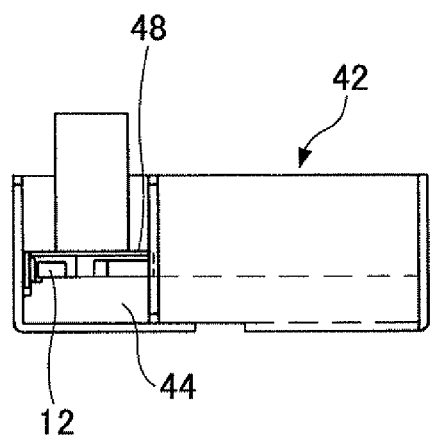
FIG. 12 is a side view of the screw loading apparatus in which the guide lid is attached to the tray.

After many screws 12 are aligned along the screw head guide slot 44a as illustrated in FIGS. 7, 8 and 9, the guide lid 48 is attached to the tray 42 so that the screws 12 are covered by the guide lid 48 as illustrated in FIG. 11. The guide lid 48 is a board having a shape, which covers only the threaded portions of the aligned screws 12. Both ends of the guide lid 48 are arranged on the blocks in the tray 42. In the state where the guide lid 48 is attached to the tray 42, there is a gap between the guide lid 48 and the threaded portions of the aligned screws 12, and, thereby, the screws 12 are movable along the screw head guide slot 44a. FIG. 12 is a side view of the tray 42 in a state where the guide lid 48 is attached to the tray 42.

After the guide lid 48 is attached to the tray 42 as illustrated in FIGS. 11 and 12, the magazine 2 is coupled to the open portion of the tray 42 (corresponding to the magazine connection part). Coupling of the magazine 2 to the tray 42 is performed by inserting the magazine guide 46, which serves as a shutter press member protruding from the tray 42, between the rails 24 so as to engage the magazine guide 46 with the rails 24.

Figure 13B:
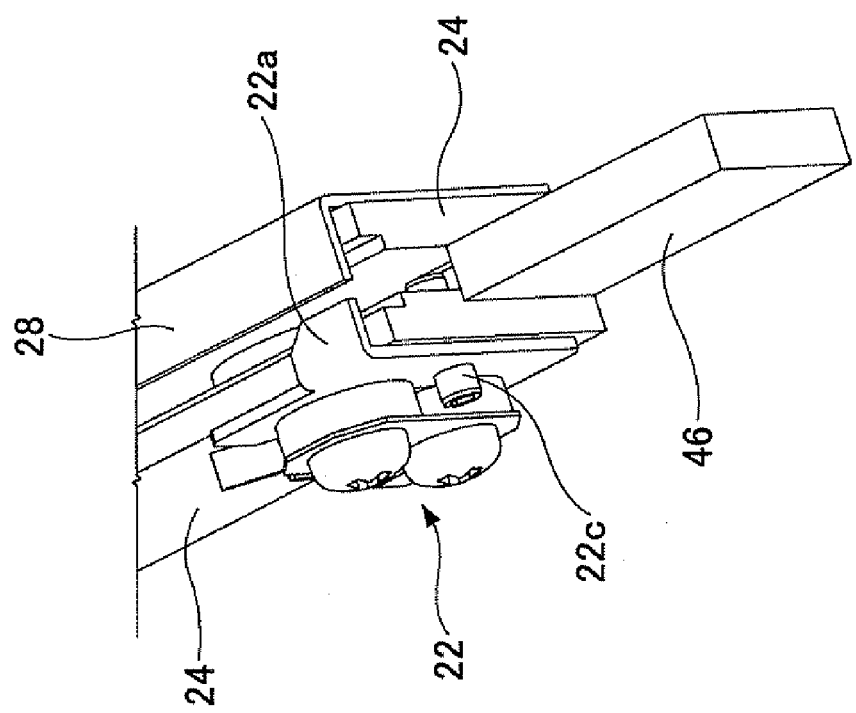
FIG. 13B is a perspective view of the shutter mechanism after engaging with the magazine guide.
Figure 13A:
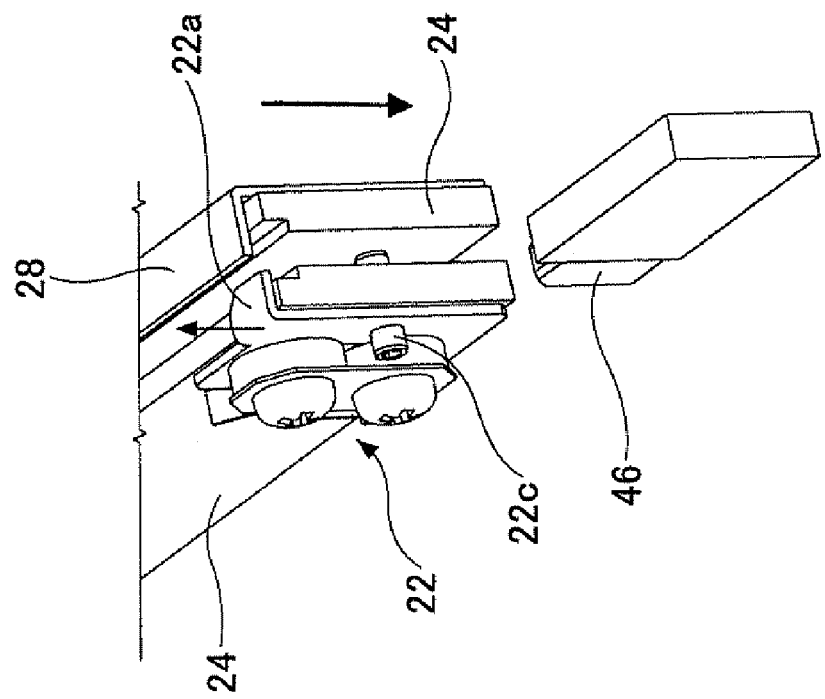
FIG. 13A is a perspective view of the shutter mechanism before engaging with a magazine guide.

FIG. 13A is a perspective view of the shutter mechanism 22 before the magazine guide 46 is inserted between the rails 42. FIG. 13B is a perspective view of the shutter mechanism 22 after the magazine guide 46 is inserted between the rails 42. The thickness of the magazine guide 46 is almost the same as the distance between the rails 24 so that the magazine guide 46 can fit between the rails 24 and engages with the rails 24.

When the magazine guide 46 is inserted between the rails 24, the shutter pin 22c of the shutter mechanism 22 is pressed by the magazine guide 46 and moves upward. Since the shutter pin 22c is attached to the shutter 22a, the shutter 22a moves to the second position, where the shutter 22a is open, with the movement of the shutter pin 22c. That is, when the magazine 2 is attached to the screw loading apparatus 40, the shutter 22a automatically opens so that the screws 12 can pass though the portion where the shutter 22a is provided.

Figure 14:
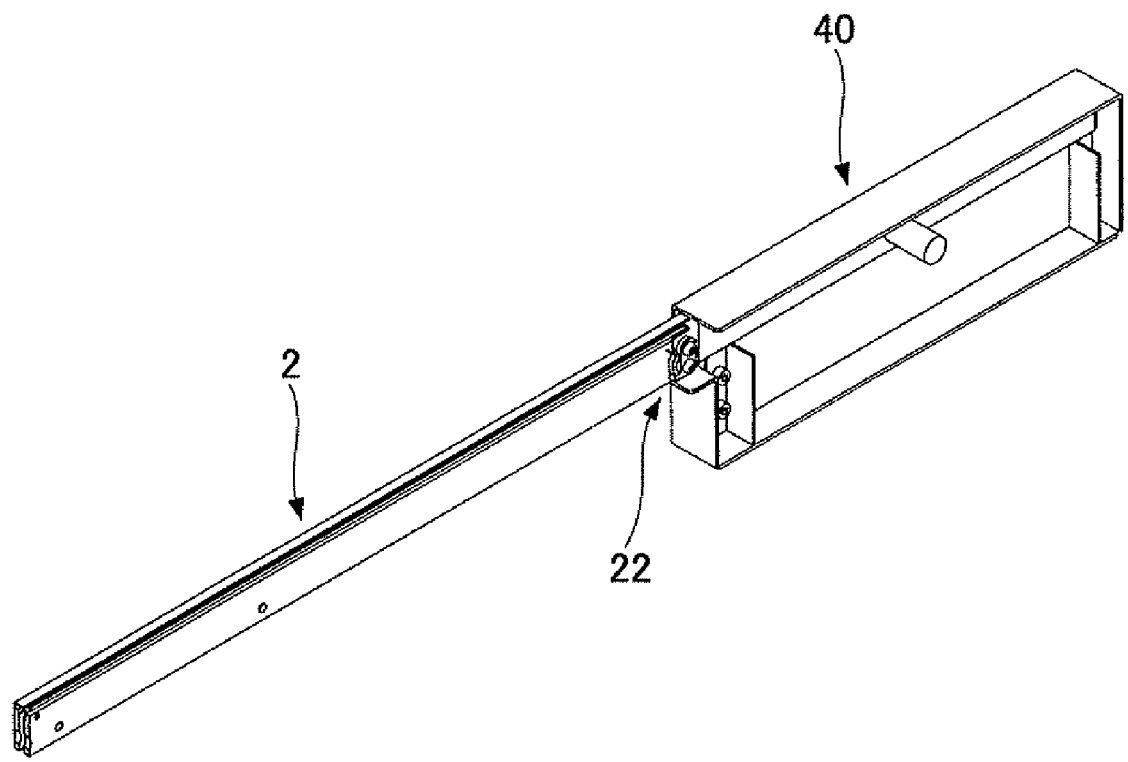
FIG. 14 is a perspective view of the screw loading apparatus connected to a magazine.

When attaching the magazine 2 to the screw loading apparatus 40, it is desirable to carry out the attaching operation in a state where the screw loading apparatus 40 is oriented vertically so that the head portions 12a of the screws 12 are up as illustrated in FIG. 14. After attaching the magazine 2 to the screw loading apparatus 40, the screw loading apparatus 40 is inclined so that the magazine 2 is lower than the screw loading apparatus 40. Because the shutter 22a is automatically open as mentioned above, the screws aligned in the tray 42 of the screw loading apparatus 40 move within the tray 42 due to gravity and pass through the connecting part of the magazine 2, and, thereby, the screws 12 are loaded to the magazine 12 with the same orientation.

After all the aligned screws 12 are transferred to the magazine 2, the magazine 2 is detached from the screw loading apparatus 40. At this time, the shutter 22a of the magazine 2 automatically closes and the screws 12 are retained in the magazine 2. In FIG. 14, the shutter mechanism 22 is provided only to one end of the magazine 2. A stopper may be provided to the other end of the magazine 2 so that the screws 12 do not move out of the magazine 2. Although the shutter mechanism 22 may be provided to both ends of the magazine 2 as illustrated in FIG. 2, the shutter mechanism 22 may be provided at least one end of the magazine 2 so that the side where the shutter mechanism 22 is provided can be used for the connection to the screw loading apparatus 40 and for the connection to the screw pick-up part 8 illustrated in FIG. 1.

A description is given below of the screw pick-up part 8, which is a part where the screws 12 are picked up by a driver bit.

As illustrated in FIG. 1, the side of the magazine 2 where the shutter mechanism 22 is provided is coupled to the screw pick-up part 8. When the magazine 2 is coupled to the screw pick-up part 8, the shutter 22a is automatically opened by the same mechanism as the coupling to the above-mentioned screw loading apparatus 40, and the screws 12 in the magazine 2 move to the screw pick-up part 8. Each of the screws 12, which have moved to the screw pick-up part 8, finally moves to the screw pick-up position, at which each screw 12 is attracted and picked up by a driver bit, and stops by being brought into contact with the stopper 54.

Figure 15:
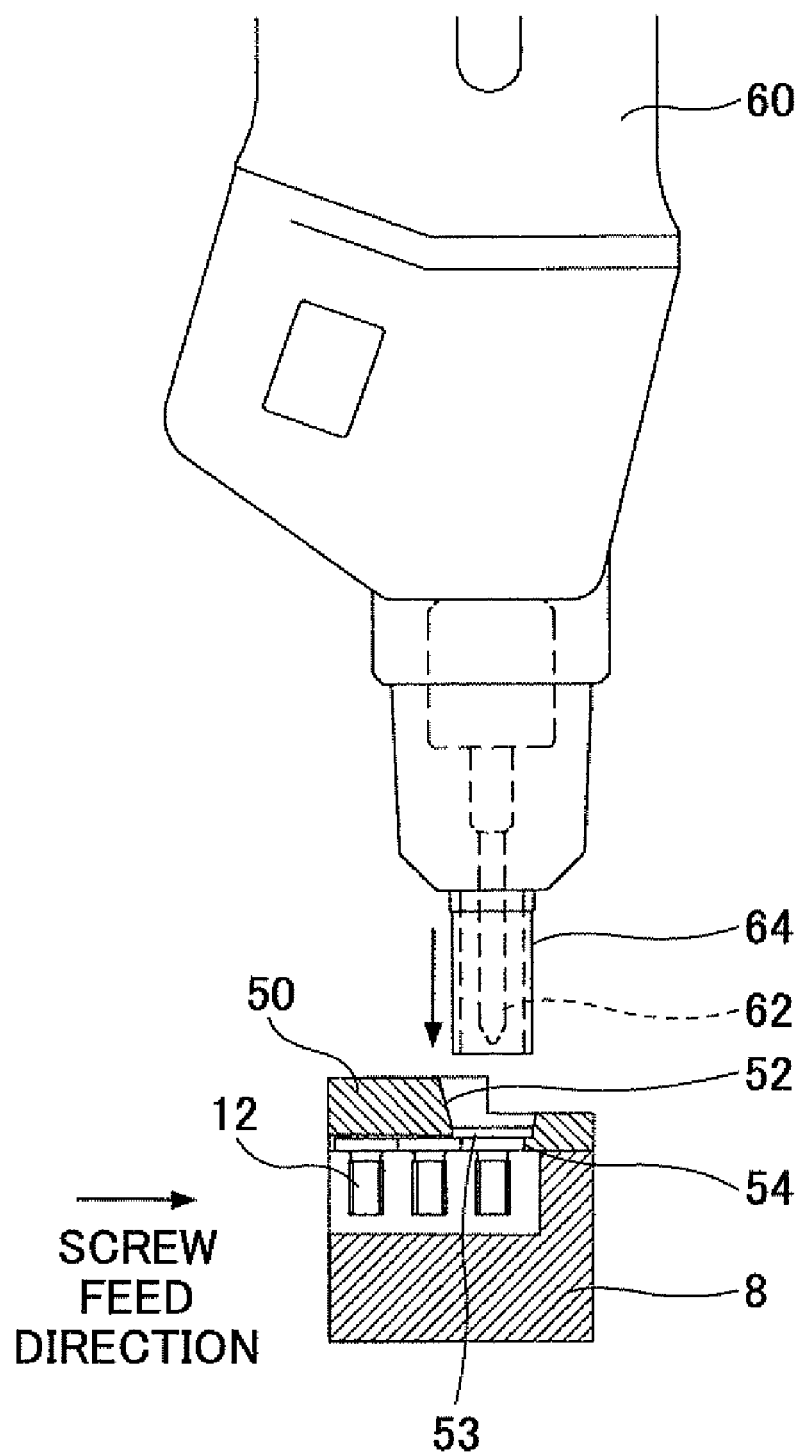
FIG. 15 is a cross-sectional view of a screw pick-up part.
Figure 16:
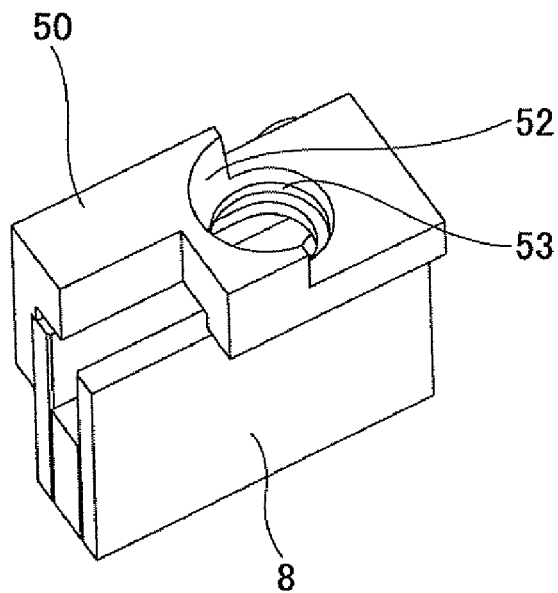
FIG. 16 is a perspective view of the screw pick-up part.

FIG. 15 is a cross-sectional view of the screw pick-up part 8. FIG. 16 is a perspective view of the screw pick-up part 8. A screw suction sleeve guide 50 is provided at the screw pick-up position of the screw pick-up part 8. In the example illustrated in FIG. 15, an electric screw driver 60 attracts and holds the screw 12 at an end of a driver bit 62 using a screw suction mechanism. The screw suction mechanism has a screw suction sleeve 64 as illustrated in FIG. 15. The screw 12 can be attached to the end of the driver bit 62 by generating an attraction force around the driver bit 62 by suctioning air inside the screw suction sleeve 64. The screw suction sleeve guide 50 is provided for guiding the screw suction sleeve 64 of the electric screw driver 60 so that the end of the driver bit 62 is positioned to the screw 12 located at the screw pick-up position.

Figure 17:
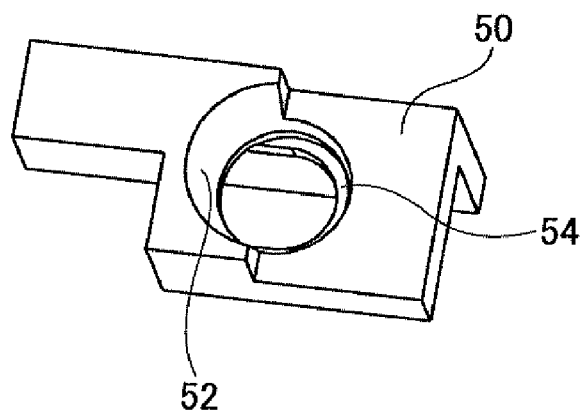
FIG. 17 is a perspective view of a screw suction sleeve guide.

FIG. 17 is a perspective view of the screw suction sleeve guide 50. The screw suction sleeve guide 50 has a screw suction sleeve guide conical part 52 in order to position the screw suction sleeve 64. The screw suction sleeve guide conical part 52 is a part of an inner surface (inner surface of a tapered cylinder), and has a screw suction sleeve positioning cylindrical part 53 in a lower part thereof. The screw suction sleeve positioning cylindrical part 53 has an opening of which diameter is slightly larger than an outer diameter of the screw suction sleeve 64 in the lower part. The center axis of the screw suction sleeve positioning cylindrical part 53 is coincident with the center axis of the screw 12, which is in contact with the stopper 54 and located at the screw pick-up position. The center axis of the driver bit 62 in the screw suction sleeve 64 is coincident with the center axis of the screw suction sleeve.

Figure 18:
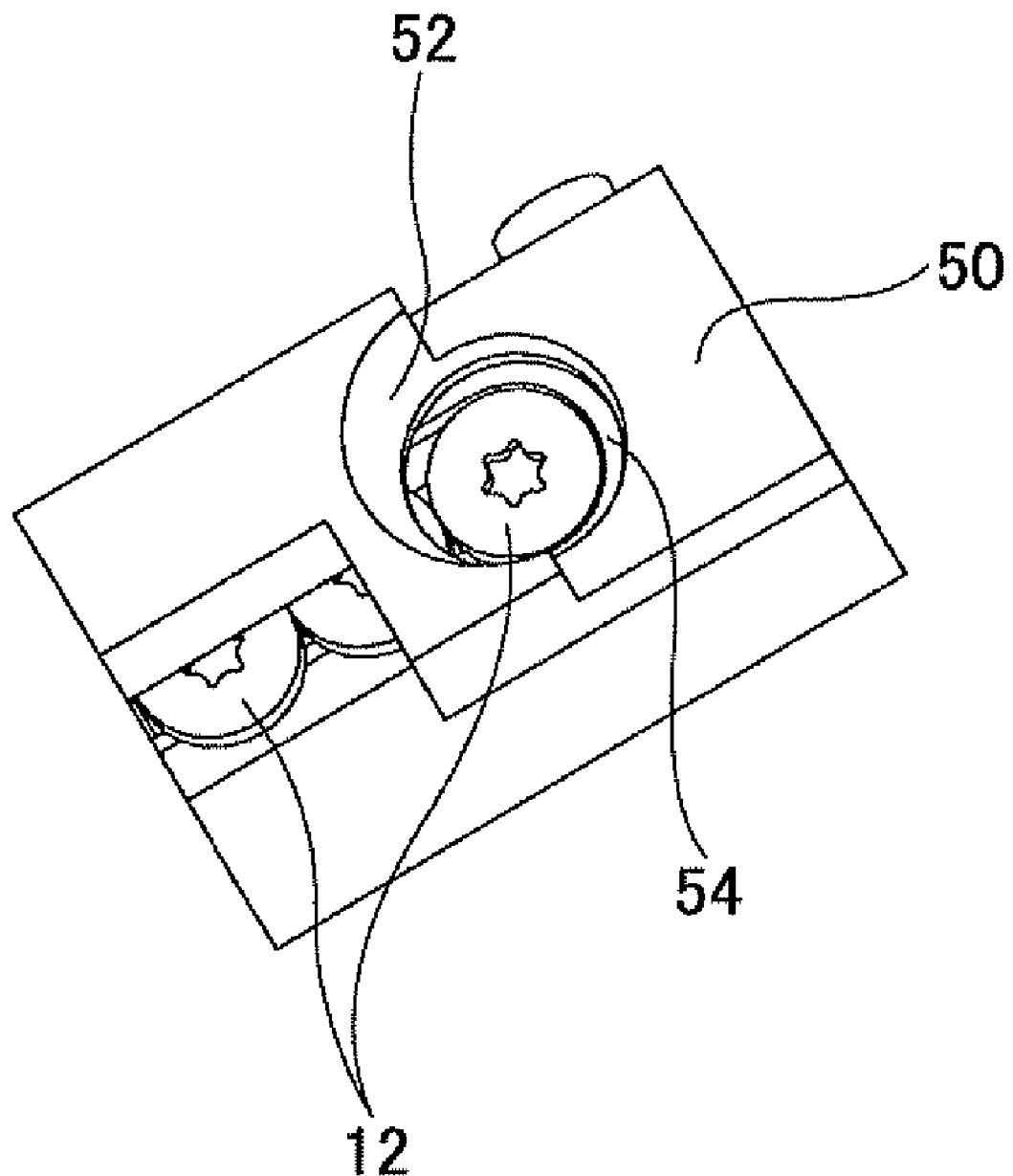
FIG. 18 is a perspective view of the screw pick-up part.

Therefore, if the screw suction sleeve 64 of the electric screw driver 60 is pressed down against the screw suction sleeve guide conical part 52 in a state where the screw 12 is located at the screw pick-up position as illustrated in FIG. 18, the screw suction sleeve 64 is guided by the screw suction sleeve guide conical part 52 and the tip of the driver bit 62 is positioned to the screw suction sleeve positioning cylindrical part 53 with high accuracy. Thereby, the screw 12 can be attached to the tip of the driver bit 62 and picked up easily from the screw pick-up part 8.

Figure 19:
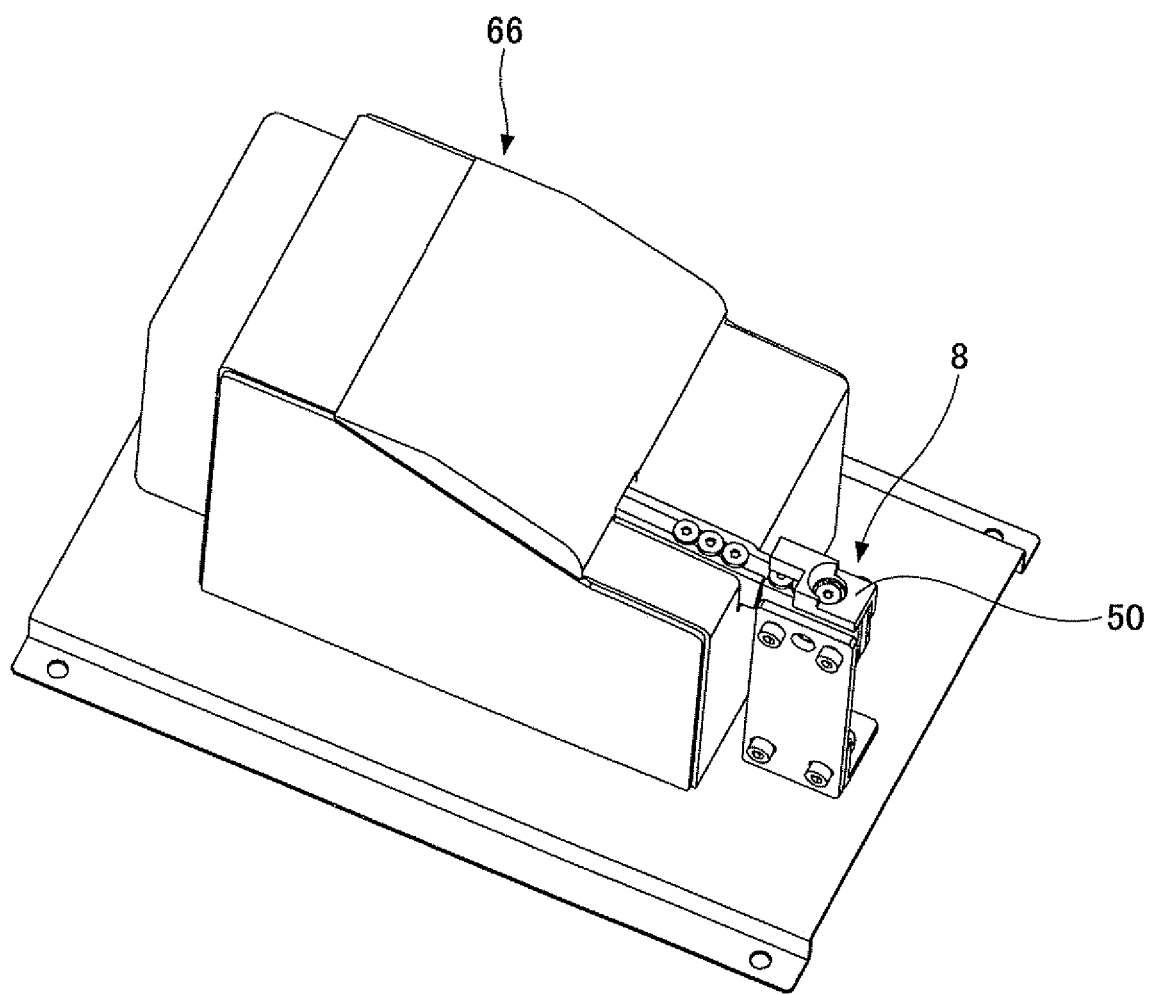
FIG. 19 is a perspective view of a screw feeder having the screw suction sleeve guide.

FIG. 19 illustrates another embodiment of the screw suction sleeve guide 50. In this embodiment, the screw suction sleeve guide 50 is arranged at the end of the screw pick-up part 8 of a screw feeder 66. The screw feeder 66 does not use a complicated screw separation mechanism, and separation and supply of screws can be achieved at a low cost.

Figure 20:
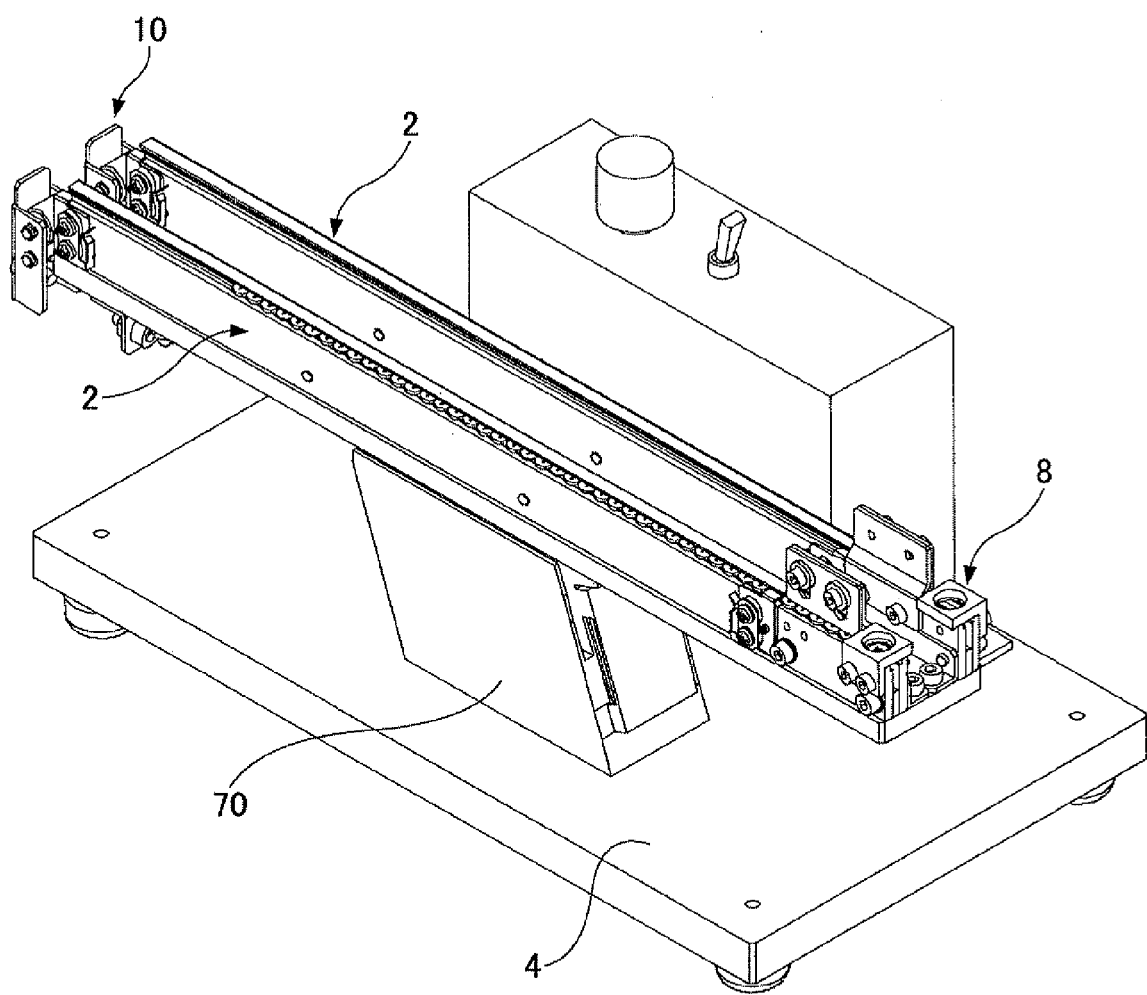
FIG. 20 is perspective view of a screw feeder using an electric feeder.

The screw feeder illustrated in FIG. 1 uses a method to feed the screws 12 to the screw pick-up part 8 by gravity by supporting the magazine 2 in an inclined state. However, the magazine 2 may be supported horizontally so as to move the screws 12 by giving a vibration to the magazine 2. FIG. 20 is a perspective view of a screw feeder using an electric feeder for giving a vibration to the magazine 2. In FIG. 20, two magazines 2 are supported horizontally, and the screws in the magazines 2 are caused to move toward the screw pick-up part 8 due to a vibration generated by the electric feeder 70.

It should be noted that although each of the screw feeders illustrated in FIG. 1 and FIG. 20 are provided with two magazines 2, the number of magazines 2 is not limited to two and only one magazine 2 may be provided to the screw feeder. By providing two magazines 2, screws can be fed continuously while exchanging the other of the magazines 2.

As mentioned above, the magazine 2 of each of the above-mentioned screw feeders can accommodate screws having a different diameter by merely replacing the spacer 26 between the rails 24. Additionally, each of the above mentioned screw feeders can load screws to the single line accommodation magazine with a simple structure.

All examples and conditional language recited herein are intended for pedagogical purposes to aid the reader in understanding the principles of the invention and the concepts contributed by the inventor to furthering the art, and are to be construed a being without limitation to such specifically recited examples and conditions, nor does the organization of such examples in the specification relates to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A screw feeder comprising:
   a magazine configured to store a plurality of screws arranged along a single line; and
   a magazine table configured to support the magazine,
   wherein said magazine includes:
   a pair of rail members slidably supporting head portions of said screws; and
   a spacer sandwiched and fixed between the rail members,
   wherein threaded portions of said screws are accommodated in a slot formed by said spacer being sandwiched between said rail members, and said rail members and said spacer are detachably attached to each other.

2. The screw feeder according to claim 1, wherein said slot between said rail members is a two-stage slot having a width of a portion on which the head portions of said screws slide larger than a width of a portion accommodating threaded portions of said screws.

3. The screw feeder according to claim 2, wherein each of said screws is a screw provided with an O-ring, and said slot includes a first slot for accommodating the threaded portions of said screws and a second slot for accommodating the O-rings.

4. The screw feeder according to claim 1, wherein said magazine further includes a cover covering a part of the head portion of each screw when said screws are accommodated in the slot.

5. The screw feeder according to claim 1, further comprising a shutter provided on an end of said magazine in a longitudinal direction thereof, the shutter being movable between a first position and a second position, the shutter being in contact with the head portions of said screws supported by said rail members at the first position, the shutter being in noncontact with the screw heads of said screws supported by said rail members at the second position.

6. The screw feeder according to claim 1, further comprising a screw loading apparatus detachably attached to said magazine so as to load said screws to said magazine,
   wherein the screw loading apparatus includes:
   a tray configured to movably accommodate said screws;
   a guide slot provided on one side of the tray so as to accommodate the head portions of said screws;
   a connection part for connecting with said magazine; and
   a lid attachable to the tray so as to cover the threaded portions of said screws of which head portions are accommodated in said guide slot in said tray.

7. The screw feeder according to claim 6, further comprising a shutter provided on an end of said magazine in a longitudinal direction thereof, the shutter being movable between a first position and a second position, the shutter being in contact with the head portions of said screws supported by said rail members at the first position, the shutter being in noncontact with the screw heads of said screws supported by said rail members at the second position, wherein said connection part of said tray includes a shutter press member that presses said shutter to move to said second position when said magazine is connected to said connection part of said tray.

8. A screw loading apparatus detachably attached to a magazine of a screw feeder so as to load a plurality of screws to said magazine, the screw loading apparatus comprising:
   a tray configured to movably accommodate the screws;
   a guide slot provided on one side of the tray so as to accommodate head portions of said screws in a state where center axes of said screws are parallel to a surface of said tray;
   a connection part for connecting with said magazine; and
   a lid attachable to said tray so as to cover threaded portions of said screws of which head portions are accommodated in said guide slot in said tray.

* * * * *